United States Patent [19]

Evans

[11] Patent Number: 5,409,315

[45] Date of Patent: Apr. 25, 1995

[54] SOLUBLE ARTICLES FOR MEASURING OR TRANSFERRING MATERIALS AND METHODS AND SYSTEMS USING THE ARTICLES

[76] Inventor: Philip S. Evans, 1215 Ladera Way, Belmont, Calif. 94002

[21] Appl. No.: 190,218

[22] Filed: Feb. 1, 1994

Related U.S. Application Data

[63] Continuation of Ser. No. 836,812, Feb. 19, 1992, abandoned.

[51] Int. Cl.⁶ ............................................. B65D 30/02
[52] U.S. Cl. ............................................. 383/1; 4/144.2
[58] Field of Search .................... 4/315, 452, 144.2; 141/337, 95; 383/1, 36; 73/294

[56] References Cited

U.S. PATENT DOCUMENTS

| | | | |
|---|---|---|---|
| 1,810,806 | 6/1931 | Wilson | 229/68 R X |
| 2,091,993 | 7/1937 | Jones . | |
| 2,234,479 | 3/1941 | Scherer . | |
| 2,580,414 | 1/1952 | Duffey . | |
| 3,209,977 | 10/1965 | Lewis et al. . | |
| 3,279,511 | 10/1966 | Griffin, Jr. . | |
| 3,346,883 | 10/1967 | Ersek | 4/315 X |
| 3,347,297 | 10/1967 | Garland . | |
| 3,415,402 | 12/1968 | Webber . | |
| 3,475,767 | 11/1969 | Friesen et al. | 383/75 X |
| 3,661,695 | 5/1972 | Berliner . | |
| 3,695,989 | 10/1972 | Albert | 383/1 X |
| 3,705,659 | 12/1972 | Mackie . | |
| 3,762,454 | 10/1973 | Wilkins, Jr. | 383/1 |
| 3,763,502 | 10/1973 | Laumann | 4/452 |
| 3,790,067 | 2/1974 | Scheier . | |
| 3,892,905 | 7/1975 | Albert . | |
| 3,920,179 | 11/1975 | Hall | 383/36 X |
| 4,073,760 | 2/1978 | Harris et al. . | |
| 4,296,859 | 10/1981 | McClinton . | |
| 4,321,101 | 3/1982 | Preiser et al. . | |
| 4,340,491 | 7/1982 | Lee . | |
| 4,681,228 | 7/1987 | Kerry et al. . | |
| 4,830,187 | 5/1989 | Keyes et al. | 383/1 X |
| 4,847,932 | 7/1989 | Baribault, Jr. | 4/452 X |
| 4,986,464 | 1/1991 | Leigh . | |
| 5,010,599 | 4/1991 | Nilsson | 4/144.2 |
| 5,039,414 | 8/1991 | Mueller et al. . | |
| 5,107,857 | 4/1992 | Linnemann et al. . | |

FOREIGN PATENT DOCUMENTS

| | | | |
|---|---|---|---|
| 2159044 | 7/1987 | Japan | 383/1 |
| 2227728 | 8/1990 | United Kingdom | 383/36 |
| WO91/09079 | 1/1991 | WIPO . | |

Primary Examiner—Allan N. Shoap
Assistant Examiner—Jes F. Pascua
Attorney, Agent, or Firm—Burns, Doane, Swecker & Mathis

[57] ABSTRACT

A soluble measuring device or vessel for measuring materials whereby the measuring device or vessel is disposed of by dissolving same in the solution prepared for the material being measured. This invention discloses articles, methods and systems, wherein hazardous or other bulk liquid or dry materials can be measured, transferred or handled wherein the articles which come in contact with the materials are soluble articles or devices that can be disposed of by dissolving those contaminated articles or devices in a solution, which preferably is the solution being prepared for immediate use of the material, or otherwise can be a solution which can be collected and disposed of in an environmentally safe and acceptable manner. The soluble articles or devices for use in the methods and systems in this invention comprise measuring vessels, tools, tool covers, work surface protective sheets, liners for funnels and other material handling tools, clothing and body covers, clean-up pads and tissues, and the like. The articles, methods and systems of this invention provide commercially cost effective methods of properly containing and disposing of hazardous materials and provides an effective alternative to improper disposal of hazardous materials, such as in landfills or sewers.

9 Claims, 6 Drawing Sheets

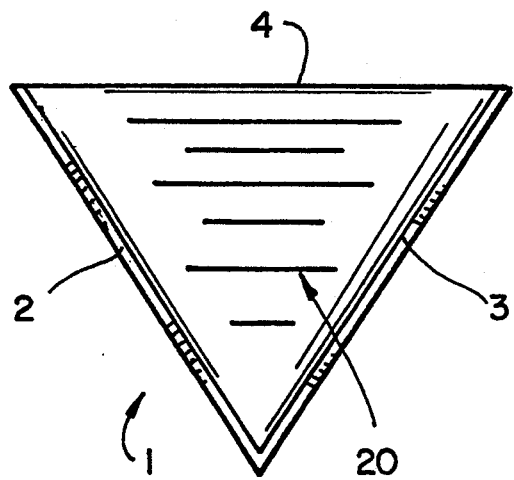
FIG_1
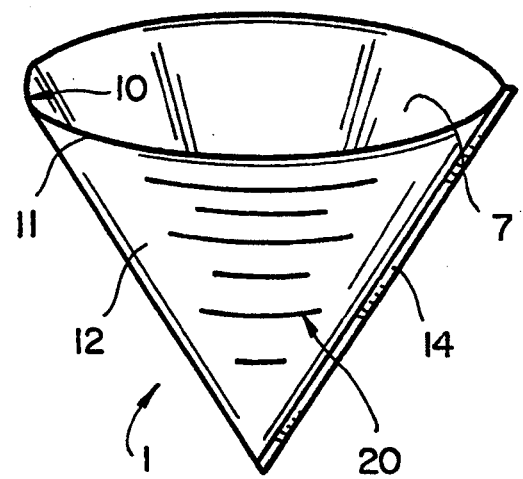
FIG_2
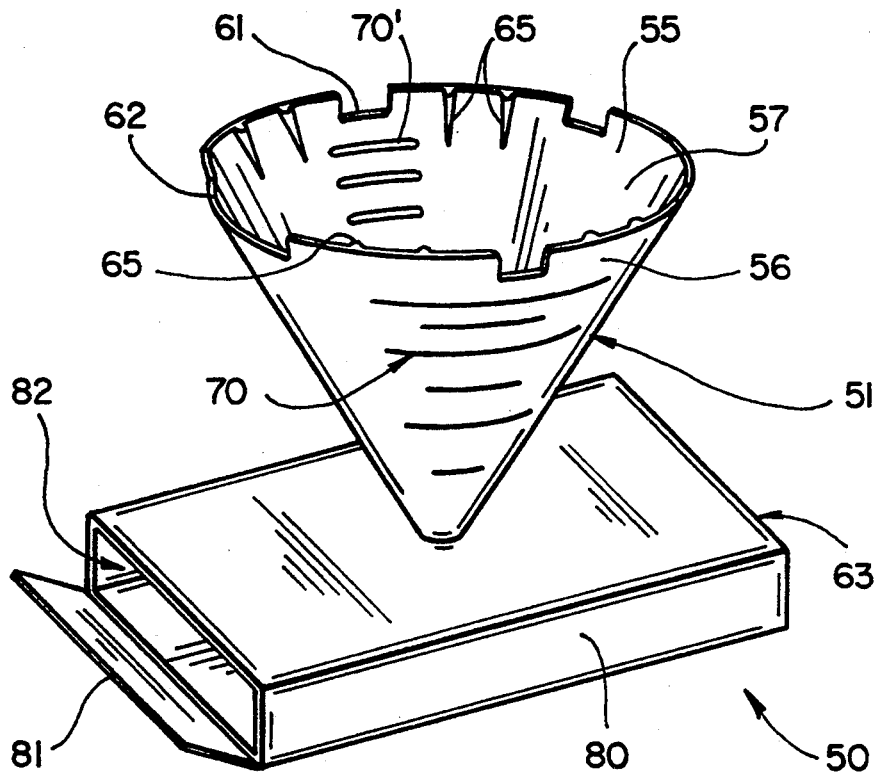
FIG_3

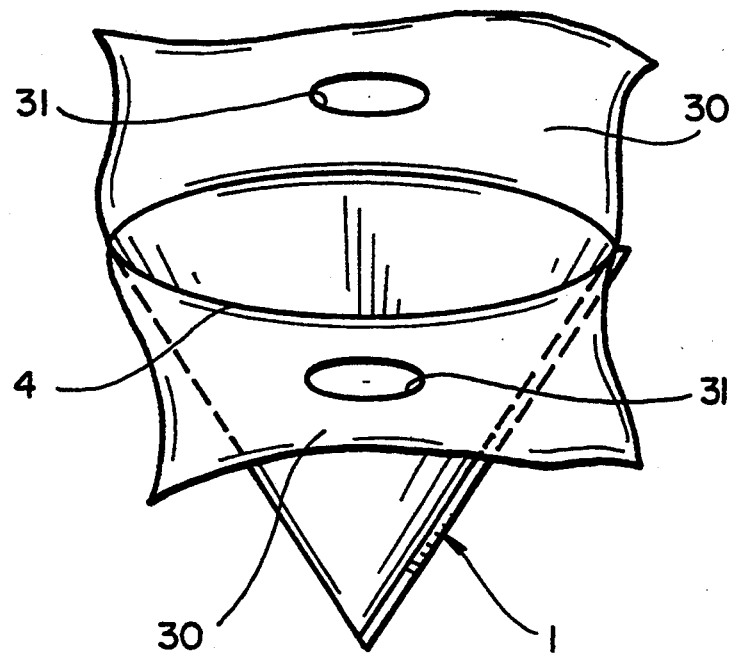
FIG_4
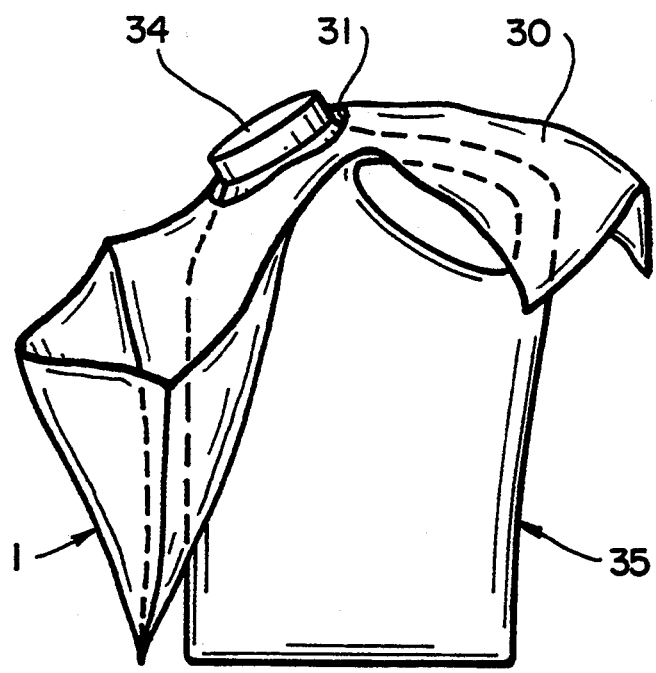
FIG_4A

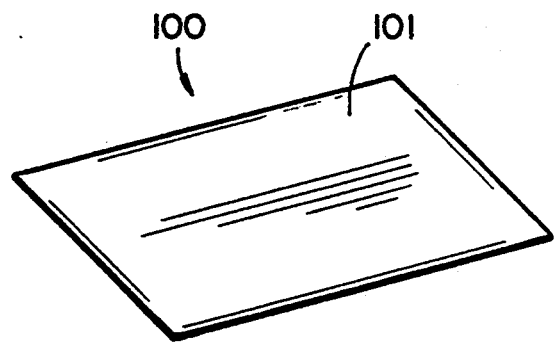
FIG_5
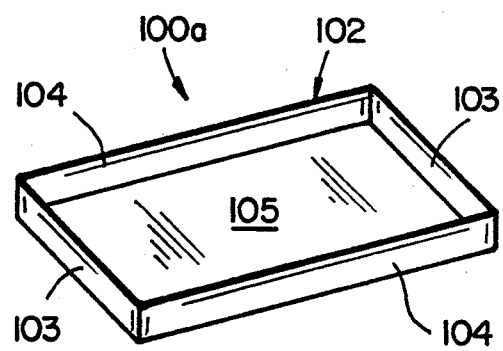
FIG_5A
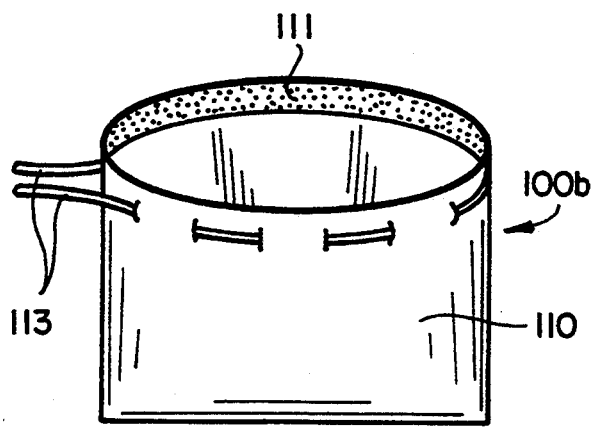
FIG_6
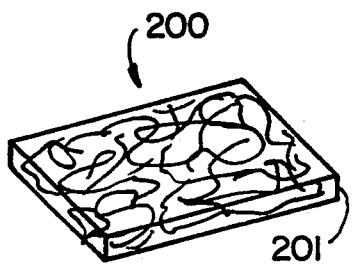
FIG_7A
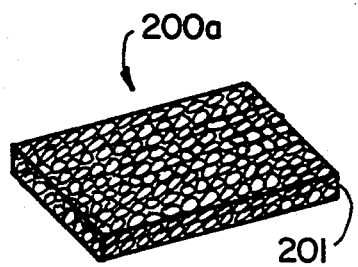
FIG_7B
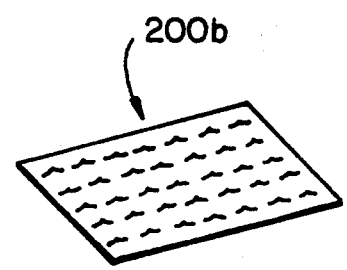
FIG_7C

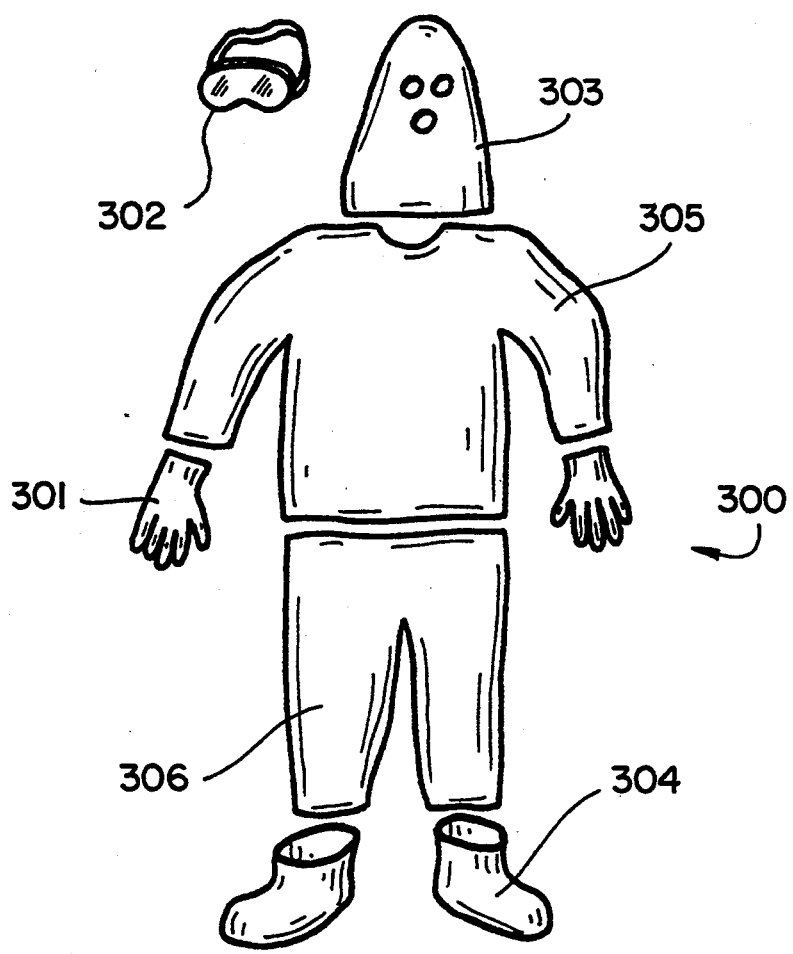
FIG_8
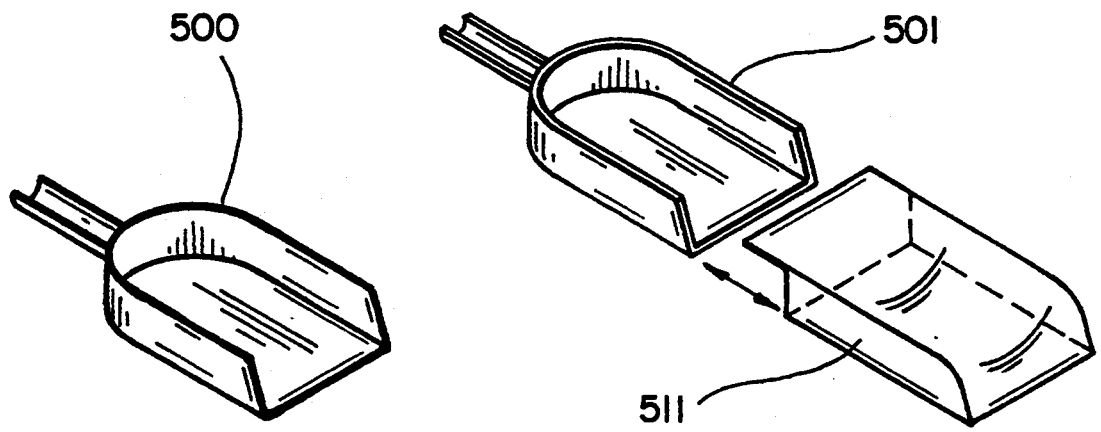
FIG_9A　　　FIG_9B

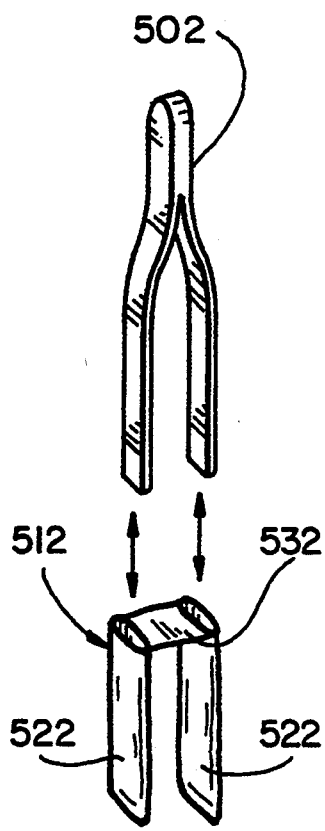
FIG_9C
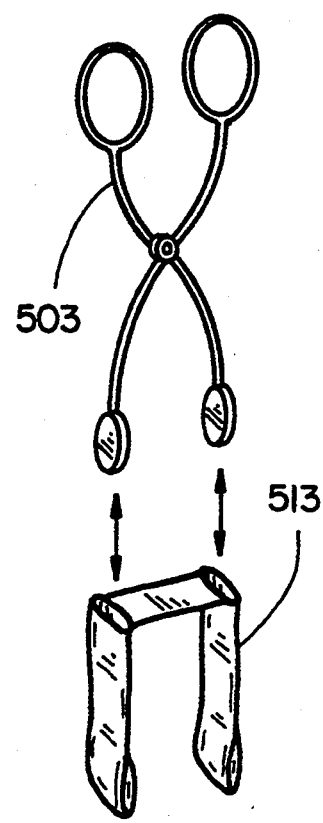
FIG_9D
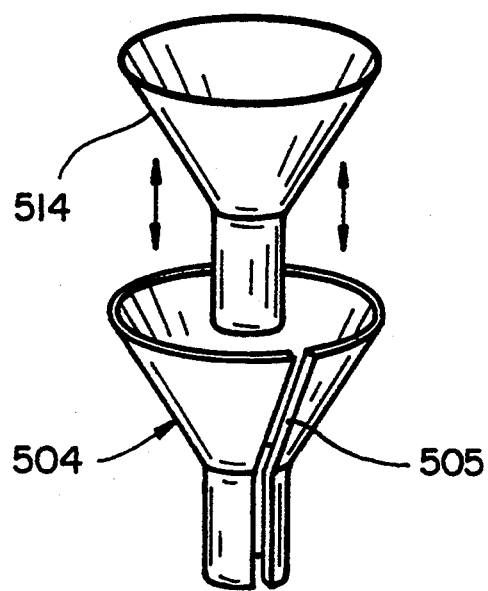
FIG_9E

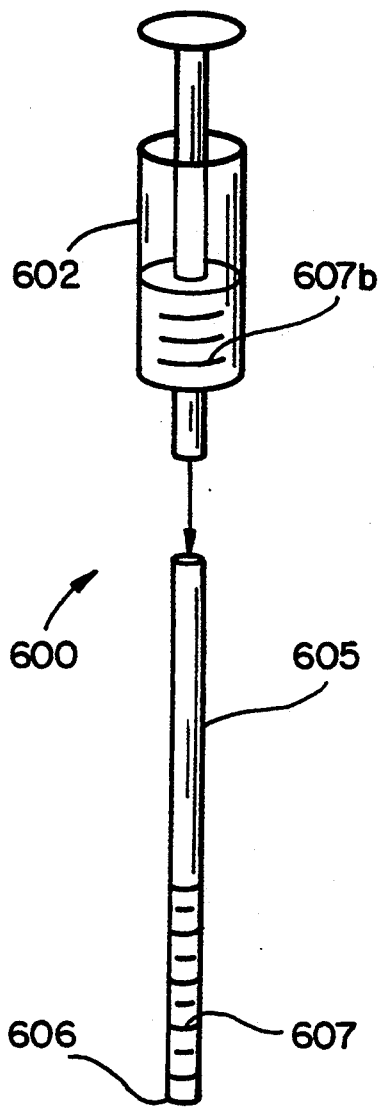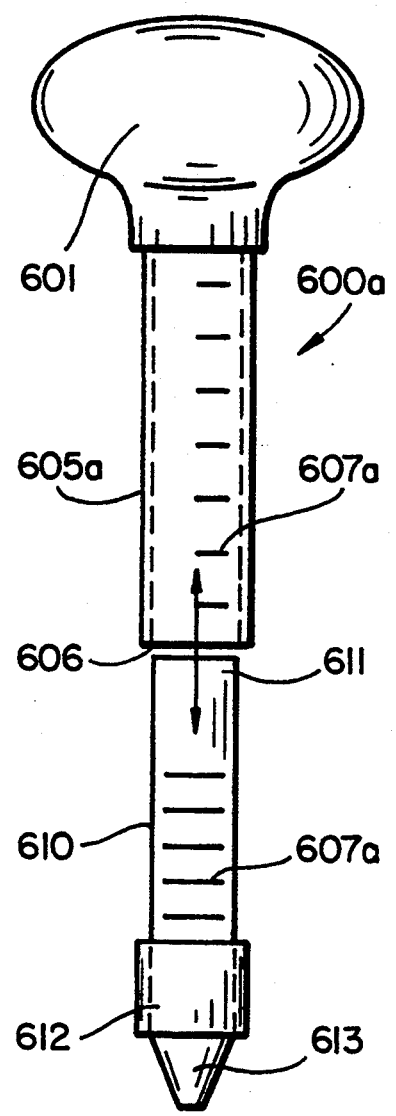
FIG_10A          FIG_10B

SOLUBLE ARTICLES FOR MEASURING OR TRANSFERRING MATERIALS AND METHODS AND SYSTEMS USING THE ARTICLES

This application is a continuation of Application Ser. No. 07/836,812, filed Feb. 19, 1992 now abandoned.

FIELD OF THE INVENTION

This invention relates in general to devices related to measuring and transferring bulk materials. More particularly, the invention relates to devices, methods and systems that can be used to measure or transfer a quantity of bulk material, while containing and disposing of residual quantities of the material in a controllable and environmentally safe manner.

BACKGROUND OF THE INVENTION

When it is necessary to measure particular quantities of bulk products, it is often necessary to utilize a measuring device such as a graduated cylinder or the like. However, such measuring devices, and often other objects, are then contaminated with the measured product. The primary area of contamination will be the internal surface of the measuring device. However, due to the surface tension of liquids, the liquid dispensing spout of a measuring device or bulk material container also often retains a small quantity of liquid material or drip on its external surface after pouring ceases. This quantity forms a droplet, which may fall or be brushed off the device or container, or dissipate into a drip run or film on the exterior surface of the container. Powdered or dusty materials provide significant contamination in a similar manner, since powder or dust measuring or other handling normally leaves a contaminant dust layer or film on the container, measuring device, and surroundings. Spills or splashes of bulk material may also occur during measuring operations, thereby contaminating the operator, the operator's clothing, work surfaces or other objects in the work place.

Measuring devices, related articles, clothing, the worker's skin, and the work area often need to be cleaned of this contamination prior to use, transport, or storage of the transferred or measured material. The objective may be ordinary sanitation, or may be to reduce the danger to the environment or to workers or persons from a hazardous contaminating material. For example, a person may inadvertently contact a contaminated surface, or may use the contaminated device to carry food material. If the device is used for another material prior to cleaning, traces of the first will contaminate the second. Chemical reaction is possible between the two substances, and may result in troublesome or dangerous consequences, including serious personal or property damage.

Thorough cleaning of measuring devices contaminated with food materials or medical wastes is also needed, to discourage vermin, insects, or microbial infestation. Public health concerns dictate a high standard of cleanliness for such devices.

In general, the cleaning of measuring devices, work areas, and related articles is inconvenient and time-consuming, adding to the expense of commercial operations. In many situations, particularly in medical, agricultural and horticultural applications, and in the use of various industrial chemicals, it may be particularly time-consuming, impractical, or dangerous to clean the measuring device thoroughly after use. The measured material may adhere strongly to the device, requiring numerous vigorous rinses or special cleaning agents. An example is the herbicide Surflan A. S. (DowElanco Corp.), of which one component is an aniline dye which is extremely difficult to clean off surfaces. In other cases, liquids spilled or splashed during handling or measuring may be absorbed into materials upon contact, or dust particles may lodge in small crevices. As a result, it may be practically impossible to remove contamination in the field. In addition, there is no known technology to absorb or otherwise pick up a droplet, spill, or a dust or liquid film, without the device used becoming contaminated with the material. In the case of hazardous materials, cleaning of contamination is very important, yet cleaning procedures increase the chances of exposure to the operator.

For many medical, agricultural and industrial chemicals, the contaminated rinse and wash liquids from cleaning operations are classified as regulated substances and may not be released into the environment through dumping or disposal through a drain system. Rinsate often must be placed in the container holding the solution to be used, or in separate containers for later use or for regulated disposal. However, it can often be very difficult to effectively wash a measuring device so that the rinsate is fully collected into a container. The shape of the measuring device may not be easily cleaned by rinsing agents, and capturing and directing the rinsate into a relatively narrow-mouthed opening of a container is often very difficult. The operation of rinsing a device may also inadvertently splash and contaminate non-target areas. This is, for example, the case when rinsing pesticide measuring devices into a typical 2–3 gallon compressed air sprayer tank prior to application of the pesticide.

The inconvenience or difficulty inherent in the cleaning process often result in measuring devices, cleaning devices, and other objects being stored or transported in a contaminated condition, or improperly disposed of instead of being cleaned. With many hazardous materials, longstanding regulations prohibit such disposal except in regulated disposal sites. However, the cost of proper disposal is so high that non-compliance is widespread, and considerable environmental pollution occurs. If different measuring devices are used for different applications, to avoid cleaning each single device, then the risks from contamination during handling, transport and storage are further multiplied.

The problem of transport and storage of normally bulky measuring devices has been addressed by patents such as U.S. Pat. No. 4,986,464 to Leigh, which discloses a foldable and unfoldable measuring device for measuring quantities of particulate materials. However, since such a device is designed for re-use, it must be cleaned to eliminate the risks from contamination during transportation, sequential uses, and disposal when no longer suitable for use.

The inconveniences and hazards of using and cleaning measuring devices that are contaminated by chemical residue have been addressed in the prior art. For example, U.S. Pat. No. 3,892,905 to Albert discloses the use of prepackaged, premeasured amounts of chemicals wherein the packages are soluble, and made from thin films of a polymer of polyvinyl alcohol and polyvinyl pyrrolidone. Other patents, such as U.S. Pat. No. 2,091,993 to Jones and U.S. Pat. No. 2,580,414 to Duffey disclose soluble capsules containing a premeasured amount of material, wherein the capsule bodies are made of gelatin, regenerated cellulose, or a starch film. However, in order to use such devices at a job site to dispense a desired amount of material, the user is at the mercy of the packager with respect to what chemicals and what prepackaged quantities of chemicals are available for use in this form. Lack of congruence is also common between the prepackaged quantity and the amount needed for a particular use. In the case of pesticides to be sprayed, a worker using premeasured packages will often have the incorrect quantity of material needed for a precisely calibrated, legal, or efficient application in a given area.

Therefore, there is a need for measuring devices, and for methods and systems for using the same, that are convenient and safe for the customized measurement of materials in the field, that require little or no cleaning of the devices, and that provide greatly reduced contamination, convenient, proper and cost effective disposal, and protection of the worker and the environment in general.

In addition to measuring devices, certain related articles are needed to completely realize the benefits of methods and systems of reducing or eliminating the time, complications, and environmental or personal safety risks involved in measuring bulk materials. These articles relate to the transfer of materials between containers and the measuring device, to the protection of the operator, the work surface, and surrounding areas or articles, and to the wiping, absorption, or suction of splashes or spills.

The invention described and claimed herein provides articles, systems and methods which satisfy the above needs for convenient and cost effective protection of the worker environment and the environment in general.

BRIEF SUMMARY OF THE INVENTION

In accordance with the present invention, there is provided a material measuring device comprising a soluble vessel or member, with the device constructed so as to provide a predetermined maximum volumetric capacity. The soluble vessel may have any useful shape, according to the desired use, such as cylinder, cone, polygonal, etc. After being filled during measuring, the vessel may be used for pouring the measured material into a container of solvent to form the required solution. The vessel can then be placed in that same solution for disposal by dissolving it therein. Instead of pouring, the filled vessel simply may be lifted and placed in the solution while still containing the measured material. If the vessel is water soluble, and there are no adverse effects on the environment from the measured material, the vessel may be disposed of by dissolving in water and placing in the sewer system.

In another aspect of the invention, the vessel is provided with a pouring spout. The lip edge of the spout can be very thin, such as that formed from a single sheet of thin material, such as a film. This configuration will provide a non-drip feature for the spout when used with liquids with sufficient surface tension to retract cleanly into the spout as pouring ceases.

In accordance with one aspect of the invention, the vessel includes measuring indicia thereon. In another aspect of the invention, the vessel is also translucent or transparent such that measuring indicia on one side of the vessel material are visible from the other side.

In accordance with another aspect of the invention, the vessel is provided with flaps or other extensions to use as handles for moving the vessel without contacting the material in the vessel or the residual material in the vessel. In a further aspect of the invention, the flaps have openings or folds to facilitate the support, positioning, or carrying of the vessel by hand or by other means. In another aspect of the invention, a flap is constructed so as to engage the dispensing portion of a bulk material container and to assist in transferring the bulk material into the measuring vessel.

In accordance with another aspect of the invention, the measuring vessel is supported by a support member. The support member may engage the measuring vessel and restrict its movement, or its volume, to a predetermined extent. In a further aspect of the invention, the material holding vessel is shaped, or provided with folds, pockets, perforations, or other adaptive features, to be received by or engaged by the support member. In a further aspect of the invention, cutaways, projections, embossing, or other surface treatments are provided on the support member, or on the measuring vessel, or both, to reduce friction between the contacting surfaces of the support member and the vessel, and thereby facilitate positioning or removal of the measuring vessel in or from the support member. Cutaways in the surface of the support member may also serve the function of providing space for gripping the vessel, or for a spout formed in the measuring vessel. In another aspect of the invention, the support member has a base for supporting the support member and the measuring vessel in a work place. Further aspects include the construction and use of parts of the support member for a variety of useful purposes, such as to serve as a handle or other means of support or manipulation, or to engage a bulk material container, or to engage the dispensing means of a container, or to assist in transfer of bulk material, or to serve as storage for the material-holding member or related articles.

In accordance with another aspect of the invention, the support member has measuring indicia. Thus further aspects of the invention include: the measuring vessel being transparent or translucent, in whole or in part, and the support member being opaque, such that measuring indicia on the support member are visible through the measuring vessel; both the vessel and the support member being transparent or translucent, in whole or in part, such that measuring indicia on the support member and/or the measuring vessel are visible through the vessel and through the support member, and such that the level of the material inside the vessel is visible through the support member and the vessel at least in the area of the measuring indicia.

In accordance with another aspect of the invention, a tissue of soluble material is provided, which may be textured to increase surface area, or a soluble cleaning pad of a woven or spun-bonded mass of flocked random threads or strips of soluble material, or of a porous, blocky mass of soluble material, such as an open cell foam is provided for clean up of contaminants. Further aspects of the invention include coating the soluble material with an absorbent substance, through the use of a soluble adhesive, which aids in retrieval of contamination, and disperses in the disposal solution upon the dissolution of the cleaning pad.

In accordance with another aspect of the invention, material handling tools are manufactured from soluble materials or are provided with soluble protective liners or covers. Soluble tools and soluble liners or covers for tools are provided for conventional uses as tongs, scoops, spoons, funnels, and suction devices. The soluble tools, liners or covers of this invention may be disposed of in a solution after use.

In accordance with another aspect of the invention, soluble work surface and work place protective devices are provided by forming covers for the work surface or other particular objects in the work place from soluble materials. These include soluble trays or sheets on which to perform measuring or other material handling, soluble storage shelf liners, soluble bags or covers for bulk material containers or portions thereof, and soluble bags for temporary storage of other soluble items which are contaminated, all of which may be disposed of in a solution after use.

In accordance with another aspect, the invention comprises human protective clothing made from soluble material, or a temporary protective cover for any part of the worker's body or clothing or for a shield worn by the worker, where the protective cover is made from soluble material, which may be disposed of in a solution after use.

In accordance with another aspect, the invention comprises a method for measuring or otherwise transferring materials using a soluble measuring device, a support member, soluble work surface or work area protection devices, soluble material handling tools or soluble liners for material handling tools, a soluble cleaning device and soluble human protective gear as disclosed, wherein these individual elements are used singly or in any combination, for particular uses.

In accordance with another aspect, the invention comprises a system for measuring or otherwise transferring materials using a soluble measuring device, a support member, soluble work surface or work area protection devices, soluble material handing tools or soluble liners for material handling tools, soluble cleaning devices, and soluble human protective gear is disclosed, with the individual elements used singly or in any combination, for particular uses.

In accordance with other aspects of the invention, the soluble measuring vessels and other soluble components are soluble in water, hydrocarbons, acids, bases or gases, depending on the circumstances, so as to provide for safe use and for disposal by dissolving same in the solvent of choice.

A primary advantage of the present invention is that it facilitates efficient and safe measurement and/or transfer of bulk materials, reduces environmental contamination, and eliminates quantities of bulky wastes. The need for time-consuming cleaning of measuring devices is largely eliminated by providing for ready use and easy disposal of the contaminated portion of the measuring device after measurement. Contamination on clothing, skin, related tools and articles, and in the work place is largely prevented by this invention. Where it does occur, it can often be simply and effectively cleaned with the soluble cleanup tools of this invention, which are also designed for similar convenient and safe use and easy disposal, as are the measuring vessel and other related articles. All of the above advantages are also obtained if the measuring devices described herein or similarly shaped or constructed devices are used for unmeasured transfer of materials.

Still further advantages of the present invention will become apparent to one skilled in the art upon reading and following the teachings herein of the general disclosure and of the following detailed description of the preferred embodiments.

BRIEF DESCRIPTION OF THE DRAWINGS

The articles, methods and systems of this invention may take various forms. The drawings are only for purposes of illustrating certain aspects and preferred embodiments of the invention and are not to be construed as limiting of the scope of the invention.

FIG. 1 is a side view of a soluble measuring vessel, which in this embodiment requires a support member;

FIG. 2 is a perspective view of a soluble measuring vessel, including a dripless spout;

FIG. 3 is a perspective view of a measuring vessel support, configured to receive and support the soluble measuring vessel in FIG. 1, and is shown provided with a base comprising a storage box;

FIG. 4 is a side view of a soluble measuring vessel with perforated flaps;

FIG. 4A shows an example of a flap in use to engage a dispenser and cover the handle of a bulk material container;

FIGS. 5, 5A, and 6 show several representative forms that different types of soluble work surface and work area protection may take (sheet, tray, and bag or cover forms are shown, respectively);

FIG. 7A shows a soluble cleaning pad of flocked soluble material;

FIG. 7B shows a soluble cleaning pad of a porous soluble material;

FIG. 7C shows a soluble cleaning tissue of a single textured sheet;

FIG. 8 shows a suit of soluble human protective clothing;

FIG. 9A is a perspective view of a soluble material handling scoop;

FIG. 9B shows an insoluble scoop and a soluble scoop sheath;

FIG. 9C shows a set of insoluble tweezers and a soluble protective covering;

FIG. 9D shows a set of insoluble tongs and a soluble protective covering;

FIG. 9E shows an insoluble slit funnel with a soluble funnel liner;

FIG. 10A is an exploded side view of a syringe-driven suction type measuring device with a soluble reservoir cylinder;

FIG. 10B is an exploded side view of a bulb-driven suction type measuring device with an insoluble cylinder and a soluble cylinder liner.

DETAILED DESCRIPTION OF THE INVENTION

The soluble material used in the various soluble articles of this invention may be specially chosen for particular applications. For instance, it will be possible to choose soluble material depending upon the characteristics of its reactivity with each particular material to be measured, and upon its ability to dissolve in a particular solution. It is well known that some soluble materials will more readily dissolve in a water solution, whereas other materials will more readily dissolve in a hydrocarbon, an acid, or a basic solution, or a solution at a different temperature, etc.

The term "soluble" as used herein in connection with describing and defining the various articles forming the aspects and parts of this invention, means that the material/article has sufficient structural integrity to fulfill its intended use and function in carrying out the present invention, that it has sufficient "work time" i.e. will not dissolve prematurely while the worker is working with the material/article or during use according to this invention, and that once it is disposed of according to this invention it is sufficiently soluble in the desired medium so that it will dissolve in the desired medium in an appropriate amount of time to carry out the methods and objectives of this invention. For example, a soluble measuring vessel constructed of a very thin film and used with a support member may be appropriate where the soluble measuring vessel is to be disposed of in the solution being prepared for immediate use. In such an embodiment, a short work time of the thin film is sufficient, because the soluble measuring vessel need not maintain structural integrity for a very long period of time, and the thin film would satisfy the need to dissolve quickly in the prepared solution, e.g., a solution that is to be applied with a sprayer immediately upon preparation. In another embodiment, the soluble measuring vessel may be a structural, stand-alone member designed for repeated use over some period of time, then disposed of in a general disposal medium, in which the soluble measuring vessel can be dissolved over a long period of time where that medium will be disposed of or used at a later time. It will be apparent to one skilled in the art following the teachings herein that various permutations of the materials/articles, methods and systems of this invention can be readily selected and employed within the scope of the term "soluble" as used in the functional sense in the context of that invention.

In particular measuring operations it will also be desirable to have a soluble material with more structural integrity than is necessary in another operation. For example, when a user is aware that the material to be measured will weaken the structure of the soluble material, it will be desirable to use a thicker layer of the soluble material, to prevent premature vessel failure, than is necessary when the material to be measured is less destructive of the soluble material or dissolves or softens the material at a slower rate.

For example, it is well known in the art that polyvinyl alcohol, polyvinyl pyrrolidone, and mixtures of polyvinyl alcohol and polyvinyl pyrrolidone, possess solubility characteristics in aqueous solutions and may be manufactured in sheet films or foamed masses of varying thickness, thermal sensitivity, plasticity, and other desired characteristics, depending on the adjuvants and processes used in manufacture. It is also well known to manufacture solid or semi-solid water soluble containers of such materials as regenerated cellulose, hydroxymethyl cellulose, starch, or gelatin. These water soluble structures may be also specially adapted for use under a variety of environmental conditions, such as humid air or high temperatures. Other materials, such as polyethylene oxide, may also provide suitable soluble films and articles for use in this invention.

FIGS. 1 and 2 show embodiments of the measuring vessel. A measuring vessel 1 is formed of soluble material such that, when the vessel is opened to a predetermined extent, the vessel has a particular, known volume. In this case, a support member is used to determine the desired usable volume of the measuring vessel. However, such a vessel may be so constructed of a flexible or semi-solid material so that it automatically assumes its maximum volume by virtue of the stresses that are set up in the vessel walls. If the vessel is constructed of a solid material, it will of course be provided with the desired volume as molded or shaped during manufacture. Thus, the vessel may be constructed to contain a certain known volume of material when completely full and, further, if measuring indicia 20 are used, the vessel may contain a determinable volume of material at whatever level in the vessel to which material is added. Beside volumetric measuring indicia, if it is known what type of material is to be measured in a vessel, it is possible to use mass or weight indicia. It is, of course, also possible to calibrate the vessels to include both a volumetric scale and mass and/or weight scales.

FIG. 1 shows by way of illustration, one possible geometric form for a measuring vessel 1. A vessel is formed by sealing or otherwise adhering two edges 2, 3 of two superimposed layers of material. A third edge 4 is not joined or sealed and thereby forms an opening 7 into which material is poured. In addition to the vessel illustrated, it is, of course, possible to form vessels in the shape of cones, cylinders, rectangular or other polygonal shapes, as well as combinations of the foregoing, and other shapes depending upon the user's desires. Further, it is possible to mold and form vessels into whatever shape is desired because a soluble material can be used in most flexible, semi-rigid or rigid plastic article manufacturing processes.

FIG. 2 shows another embodiment of the soluble measuring vessel 1, the vessel 1 including a dripless spout 10 formed, for example, from the edge 11 of a bend in a single sheet of soluble film 12 sealed along edge 14, such that the resulting vessel 1 is substantially triangular. Other methods of constructing a thin section to serve as a dripless lip for the spout are known in the plastic forming art.

Measuring vessels may be constructed to possess sufficient structural integrity to support themselves in upright positions on work surfaces (example not shown). It may also be desirable to use thinner, more flexible material, or a shape which does not support itself in an operable position but will be more quickly and easily dissolved in solution when desired. In such cases, as illustrated by measuring vessel 1, it is therefore desirable to use the measuring vessel 1 in conjunction with a measuring vessel support 50, as shown in FIG. 3. A top 51 is formed, in this case with two sides 55 and 56, such that the interior dimensions of the support 50 which engage the vessel 1 conform to the desired exterior dimensions of a measuring vessel 1. The top 51 is mounted on a base 63. An opening 57 in the top 51 conforms to a desired fully opened position of the measuring vessel 1.

When a measuring vessel 1 is used in conjunction with a measuring vessel support 50 it is desirable to be able to easily set the measuring vessel in position and, after use, be able to remove the measuring vessel from the support. These tasks may be facilitated by such features as cutaways 61 or projecting ribs 65, or both, circumferentially arranged on the inner or the outer sides, or both, of the sides 55, 56 of the top 51, and which reduce frictional adhesion of the contacting surfaces of the vessel and support member. The measuring vessel 1 may also be formed to include ribs or other projections (not shown) around its exterior surfaces, for the same purpose. Ribs or projections on the vessel may comprise, for instance, embossing, or a series of sealed folds around the top edge, formed with the soluble plastic film. Cutaways 61 are also highly useful for providing points at which the vessel 1 can be gripped. A cutaway 62, placed as illustrated to coincide with the position of a spout 10 on the measuring vessel 1, as in FIG. 2, will be useful for supporting the spout and allowing material to be poured from the measuring vessel without the material contacting support 50.

Additional features of the support 50 may be devised to provide for convenient storage of desired articles, illustrated by way of example in FIG. 3 as box 80, with a hinged closure 81, and having an opening 82 into an interior volume for storage. Box 80 forms part of the base 63 and provides storage space for a supply of the disposable measuring vessels 1 used in conjunction with support 50. Other structural modifications to the shape or structure of the support 50 may be devised for a further variety of useful purposes, such as to firmly engage the vessel 1, engage a bulk material container, provide a means for engaging the dispensing means of a bulk container, hold or carry the support 50, etc.

Further, as shown in FIG. 4, by constructing the soluble measuring vessel 1 to include extensions of the surfaces of the measuring vessel into flaps or handles 30, a measuring vessel 1 may be lifted, used for pouring, or, when used with support 50, pulled from a measuring vessel support 50 by gripping flaps or handles 30 at a distance from a potentially contaminated top edge 4. The flaps 30 may also be provided with openings 31, folds (not shown), pockets (not shown), or other means by which the vessel 1 may be gripped or lifted, so that the vessel may be more easily removed, manipulated, or transported. Flaps 30 may also be modified to provide a means for engaging support 50. As shown in FIG. 4A, such flaps may also be configured to engage the dispensing means 34 and cover the handle of a bulk material container 35, thereby guiding material into the vessel i while protecting the surface of the container 35 from spills, and protecting the operator from any contaminant residue on the handle of the container. Many other diverse conformations of these extensions of the walls of the soluble measuring vessel 1 may be constructed to adapt to various purposes furthering the intent of this invention to facilitate clean, efficient, and convenient measurement or transfer of materials.

Measuring vessels 1 and measuring vessel supports 50 may be opaque, translucent, or transparent, in whole or in part, as utility or tastes dictate. In addition to, or instead of, measuring indicia 20 on a measuring vessel 1, measuring indicia 70 may be put on the interior or exterior surfaces of measuring vessel support 50. Different methods of indicating measurement are used, depending upon preference or intended application. For example, if both the soluble measuring vessel 1 and the measuring vessel support 50 are opaque, measuring indicia will be most useful on the inside of the measuring vessel 1. However, if the measuring vessel 1 is sufficiently flexible and conforms to the interior of the top 51 of the measuring vessel support 50, it may be desirable to have inwardly projecting measuring indicia 70', e.g. horizontal or vertical projecting ridges, formed on the inner surface of the measuring vessel support 50 such that the measuring indicia are detectible as bumps in the opaque, flexible measuring vessel walls, which indicia would become increasingly visible as the soluble measuring vessel 1 is filled with a liquid material and would be particularly useful where the opacity of the material being measured may obscure other forms of measuring indicia. In another preferred embodiment, the measuring vessel 1 and the measuring vessel support 50 are translucent or transparent, such that printed measuring indicia 20 or 70 on a measuring vessel 1 and on a measuring vessel support 50, respectively, are visible through the measuring vessel support 50 and the measuring vessel 1, respectively. Obviously, quite a number of potential combinations are possible with respect to the type of measuring indicia used on the measuring vessel 1 and the measuring vessel support 50, i.e., printed, molded, raised, recessed, etched, etc., gradations, as well as with respect to the opacity or transparency of the measuring vessel 1 and the measuring vessel support 50.

Prior to, during, and after measuring material with a soluble measuring vessel, as with any measuring device, it is desirable to protect all objects present in the work area, and the area surrounding the work station from dust, drips, spills or splashes. Thus, protection for material handling tools and for the skin and/or clothing of the operator during these processes is desirable. It is further desirable to clean up insoluble articles or parts, such as measuring vessel supports 50, dispensers of bulk material containers (not shown), work surfaces (not shown) and other material-contaminated tools or articles (not shown), to ensure that inadvertent contamination of those parts does not remain. These and other objectives are accomplished using a measuring vessel 1, a measuring vessel support 50, a soluble work surface protection device 100, a soluble cleaning device 200, soluble protective gear 300, soluble material handling tools or tool liners 500 and suction devices 600.

A soluble work surface protection device 100 may take several forms, as is shown in FIGS. 5, 5A, and 6. FIG. 5 shows a soluble flat sheet 101 which is spread out over a work surface, or draped over nearby objects or surfaces. The flat sheet 101 is a soluble material and may be pre-cut or cut in the field to a predetermined size, or rolled up in a roll (not shown) to be cut off at desired lengths or torn off at perforations.

FIG. 5A shows an alternative embodiment of a soluble work surface protection device 100a in which soluble material is formed in the shape of a shallow tray 102. If rectangular, as shown, the shallow tray may be preconstructed with two equal length sides 104 and two equal width sides 103 surrounding the periphery of a tray bottom 105, and may be sealed or molded in such a form, or it may be constructed in the field from a sheet (not shown) with pre-cut perforations and inserts (not shown) or with adhesive patches (not shown) to form the tray shape.

FIG. 6 shows yet another embodiment of a work surface protection device 100b. In this embodiment, a bag 110 is formed to contain the measuring vessel 1 and the measuring support 50, or may be positioned to contain or cover any item in the work place needing protection from contamination during the measuring or cleanup process. The bag may take many forms, including, but not limited to, two rectangular sheets sealed at three edges to form an opening at a fourth edge, as well as forms in which there are defined bottom portions and sides (not shown). Bags or covers may be molded, or fitted to cover any objects by cutting sheets of soluble material and folding or sealing with heat, soluble drawstrings 113, soluble adhesives 111, or other techniques known in the art.

After completion of the measuring process, the measuring vessel 1 and the work surface protection devices 100, 100a or 100b are disposed of by dissolving them in the solution for which material is measured, or in some other solution designed for safe use or disposal.

In addition to protecting the work surface upon which materials are measured or handled, it is desirable to be able to clean any items which may have material residue on them, particularly an insoluble measuring vessel support 50, the dispenser 31 or the surface of a bulk material container 35, the work surface, and objects in the work place. To this end, a soluble cleaning device 200 is constructed. A cleaning device 200, as shown in FIG. 7A, is constructed as a pad of woven or bonded, flocked threads or strips of soluble material with strands or flocking of a sufficiently fine texture to create a wicking action when the pad is brought into contact with a liquid substance. Alternatively, a cleaning device 200a, as shown in FIG. 7B, may be made of porous soluble material to create a pad of sufficient porosity to absorb spills effectively. In a preferred embodiment, the device or pads 200 or 200a are substantially smaller in one direction of an X-Y-Z coordinate system than in the other two directions, and further includes sharp corners 201, these two features having been found to be beneficial for cleaning in small spaces such as the threads of a screw cap opening on a dispenser of a bulk material container. For other applications, however, a thicker, amorphous soluble pad more capable of absorbing large quantities of liquid will be desirable. In another embodiment, the cleaning device 200b, as shown in FIG. 7c, may be made of a flexible sheet of soluble material, and may be textured, treated, or coated to render it useful for wiping up small quantities of material. In addition these articles may include an adhesive property on the surfaces to make them particularly useful in cleaning particulate materials. After use, the cleaning device 200 is added to a solution for use or disposal.

It is also desirable to protect a user's person during the measurement and cleanup of material. To this end, FIG. 8 depicts a variety of soluble human protective clothing 300. Such articles of clothing as work gloves or overgloves 301, protective eyewear or eyewear covers 302, face masks or head coverings 303, boots or overshoes 304, jackets, bibs, smocks, or sleeve covers 305 and pants, aprons, or leggings 306 are manufactured from a soluble material and are disposable by dissolving them in a solution after use and contamination. These may be configured for use over all or part of clothing, protective gear, eyeglasses or shoes, or may be used in some cases directly in contact with the skin of the worker. As will be apparent to one skilled in the art, these soluble articles of worker or clothing protection will have limited useful life and care will need to be exercised to assure disposal before the article can dissolve and allow any material to pass through the article onto the skin or clothing of the worker.

The use of the soluble measuring vessel is further simplified and made safe with the use of devices such as, in a preferred embodiment, a soluble scoop or spoon 500, shown in FIG. 9A, with which bulk materials are transferred to the measuring vessel from a bulk container that may not have a convenient dispensing mechanism such as a spout. The soluble scoop or spoon may or may not be provided with a bowl, and is particularly useful for transferring dry bulk material such as powders or granules, but is useful as well, when provided with a bowl, for liquid materials. The scoop or spoon may also be used as a measuring device. After a certain period of use, the soluble scoop or spoon is disposable in a solution. FIG. 9B shows a conventionally shaped scoop 501 over which a soluble sheath 511 may be slid. Sheath 511 may conform substantially to the shape of scoop 501 by way of custom fitting, or by construction from a sufficiently flexible material. FIG. 9C shows a conventional set of tweezers 502 with soluble covering 512 for the tips of the tweezers. Soluble covering 512 may be a single piece in which two separate legs 522 are connected by a flap 532, or may merely consist of two legs 522. FIG. 9D shows a conventional set of tongs 503 with a soluble covering 513, which is similar in shape and function to soluble covering 512 for the tweezers. FIG. 9E shows a special application funnel 504 which may receive soluble funnel liner 514. Funnel 504 includes a longitudinal slit or notch 505 extending a sufficient portion of the height of the funnel 504 to enable removal of liner 514 through slit or notch 505. When it is desired to remove soluble funnel liner 514, it may be withdrawn from the funnel 504 through the side notch 505, thus preventing inadvertent contamination of the funnel 504 by the funnel liner 514 dripping its contents on the interior of funnel 504, as would occur if soluble funnel liner 514 were withdrawn upwardly. To avoid contamination, both upper and lower sections of the soluble funnel liner 514 must be longer in the vertical dimension than their respective counterparts in the funnel 504.

Any of the material handling tools of FIGS. 9A-9E may be constructed entirely of soluble material, eliminating the necessity of a soluble cover or liner. Thus, the tongs, funnel, etc. themselves may be soluble and disposable by dissolving in a solution.

FIG. 10A shows a suction device 600 that is useful for measuring liquid material to be added to a solution, for transferring material between containers, or for suctioning spills of limited volume, and then disposing of contaminated portion of the device in a solution. The suction device 600 is provided with means of creating and controlling suction volume, such as a vacuum pump where the suction is created and controlled by the action of a piston pump (not shown), or, for example, a manual syringe 602, which may be provided with measuring indicia 607b, and a soluble reservoir cylinder 605, which may be provided with measuring indicia 607. FIG. 10B shows an alternate embodiment in which a flexible bulb 601 is used to provide suction.

Alternatively, if the reservoir cylinder is insoluble, as in 605a it is further provided with a soluble reservoir cylinder liner 610, as shown in FIG. 10B. In a preferred embodiment soluble cylinder liner 610 comprises a thin walled cylinder with a top portion 611 that conforms to the shape of the inside of the cylinder 605a and includes a lip or rolled-over portion 612 for engaging the tip 606 of the cylinder 605a, and a suction tip portion 613. Soluble cylinder liner 610 is inserted into the cylinder 605a, and the cylinder liner 610 preferably extends the length of the cylinder, although this is not necessary. The exterior portion 612 may extend upward any distance needed to protect cylinder 605a from contamination as it is dipped into the material to be suctioned. The suction tip 613 is shaped to increase suction as needed under varying circumstances.

The bulb or syringe portion 601/602 of the suction device 600a is prevented from being in contact with the liquids that are drawn into the suction device by using a bulb or syringe 601/602 with a smaller interior volume than the interior volume of a cylinder 605a/605, and by maintaining the suction device in a vertical or near vertical position with the syringe or bulb 601/602 above the cylinder 605a/605. Soluble cylinder liner 610 is, as noted above, preferably the length of the cylinder 605a, but preferably need only be as long as is necessary to have greater interior volume than bulb 601. As long as the cylinder 605a is near vertical, other means of controlling and restricting the vacuum created in cylinder 605a, such as controlling the thrust length of a syringe, or limiting the cycling and displacement of a piston pump, can be used to limit the entry of liquids into the cylinder 605a, and, consequently, soluble cylinder liner 610, during suctioning.

Another embodiment (not shown) of the present invention further comprises a flexible portion of soluble cylinder liner 610 that engages with the top portion of soluble cylinder 605a and is folded over the top portion of the cylinder 605 to further prevent contamination of cylinder 605a.

Another embodiment of the present invention comprises a suction device 600/600a wherein both a cylinder 605/605a and a bulb or syringe portion 602/601 are soluble.

In FIG. 10B cylinder 605a or the cylinder liner 610, or both, may have measuring indicia 607a thereon, providing for a suction type measuring device.

It is often desirable to use such soluble articles as the measuring vessel 1, the work place protective device 100, the cleaning device 200, the protective gear 300, the material handling device 500, and the suction device 600 described previously more than a single time. To that end, the soluble material from which some of these items are constructed may often possess greater structural integrity than the material used in other items or applications described above. It is not necessary that all of the soluble items be soluble in the same kind of solution. For instance, a measuring vessel may be hydrocarbon soluble whereas a cleaning device and a work surface protection device may be soluble in water, or vice versa.

The present invention further includes a method for measuring materials comprising protecting an article, a work surface, or other objects in a work area with a soluble work surface protection device 100, wearing soluble human protective clothing 300, using soluble material handling tools 500 or 600, or soluble covers or liners for material handling tools 500 or 600 to handle materials, measuring materials with soluble measuring devices 1, or 600, and related articles, transferring measured materials into use, removing and cleaning support devices 50 and any contaminated insoluble parts, tools, containers, or other articles with a soluble cleaning device 200, and/or disposing of each of the soluble articles in a solution.

The present invention further includes a system for measuring materials comprising soluble work surface and work area protective devices 100, soluble human protective clothing 300, soluble material handling tools or soluble liners or covers for material handling tools 500 and 600, soluble measuring devices 1 and 600, and/or related equipment, wherein materials are transferred by pouring, or by material handling tools 500 or 600, to the measuring devices 1 or 600 located over or near the surface protection devices 100, and are measured and transferred into use, after which support devices 50 and any contaminated insoluble parts, tools, containers, or other objects are cleaned with a soluble cleaning device 200, and/or the soluble articles are each thereafter disposed of in a solution.

Depending on the nature of both the soluble and contaminating materials, disposal of the dissolved soluble articles can also be in a sewer system, landfill, or incinerator, or directly into the environment, without adding bulky wastes or otherwise damaging the environment. However, a preferred use and objective of the articles, methods and systems of this invention is to enable the containment and/or clean-up of the contaminant and disposal of the contaminant together with the soluble containment and/or clean-up articles of this invention right in the solution being prepared for use, e.g., an insecticide or herbicide spray solution, a fertilizer solution, a cleaner solution or any other solution used in private, commercial, or industrial applications. Alternatively, the disposal of those soluble articles can be in a waste solution that can be processed for recycle or disposal in an environmentally acceptable and safe manner. One main benefit of the articles, methods and systems of the present invention is that they provide the above commercially viable and economical alternatives to the expensive process of regulated waste disposed, and to the common unacceptable practice of disposing of such contaminants in such a manner that environmental pollution occurs.

While the present invention has been described with respect to its various and preferred embodiments, it is not intended to limit such invention by the description given. Various alternative embodiments not specifically described will be readily apparent to those skilled in the art, and it is intended that they be embraced within the scope of the invention, insofar as the appended claims may permit.

What is claimed is:

1. A measuring device for measuring contaminant material comprising:

a measuring member consisting of a flexible wall of water soluble material where the entire measuring member and the flexible wall are water soluble defining a measuring member interior having a predetermined maximum volumetric capacity, the wall defining an opening for receiving contaminant material into the measuring member interior; and measuring indicia positioned relative to the flexible wall for indicating a quantity of a contaminant material present in the measuring member interior;

wherein said water soluble measuring member is disposable in water, along with any containment material contained therein or adhering thereto, by being dissolvable in water at ambient temperature to thereby form a solution.

2. A measuring device according to claim 1, further comprising a support member for supporting or holding the soluble measuring member.

3. A measuring device according to claim 2, wherein the water soluble measuring member is polyvinyl alcohol, polyvinyl pyrrolidone, a mixture of polyvinyl alcohol and polyvinyl pyrrolidone, regenerated cellulose, hydroxymethyl cellulose, starch, gelatin, or polyethylene oxide.

4. A measuring device according to claim 1, wherein the water soluble measuring member is polyvinyl alcohol, polyvinyl pyrrolidone, a mixture of polyvinyl alcohol and polyvinyl pyrrolidone, regenerated cellulose, hydroxymethyl cellulose, starch, gelatin, or polyethylene oxide.

5. A measuring device for measuring contaminant material, comprising:

a measuring member consisting of a wall of water soluble material wherein the entire measuring member and the flexible wall are water soluble defining a measuring member interior having a predetermined maximum volumetric capacity, the wall defining an opening for receiving contaminant material into the measuring member interior; and measuring indicia positioned relative to the flexible wall for indicating a quantity of contaminant material held in the measuring member interior;

wherein said water soluble measuring member is disposable in water, along with any contaminant material contained therein or adhering thereto, by being dissolvable in water to thereby form a solution.

6. A measuring device according to claim 5, further comprising a support member for supporting or holding the soluble measuring member.

7. A measuring device according to claim 5, wherein the water soluble measuring member is polyvinyl alcohol, polyvinyl pyrrolidone, a mixture of polyvinyl alcohol and polyvinyl pyrrolidone, regenerated cellulose, hydroxymethyl cellulose, starch, gelatin, or polyethylene oxide.

8. A method of measuring contaminant material comprising:

providing a measuring member consisting of a wall of water soluble material wherein the entire measuring member and the flexible wall are water soluble defining a measuring member interior having a predetermined maximum volumetric capacity, the wall defining an opening for receiving contaminant material into the measuring member interior, the water soluble measuring member including measuring indicia positioned relative to the flexible wall for indicating a quantity of contaminant material held in the measuring member interior;

wherein said water soluble measuring member is disposable in water, along with any contaminant material adhering thereto, by being dissolvable in water to thereby form a solution; and filling the water soluble measuring member with contaminant material to thereby provide a measured quantity of contaminant material.

9. A measuring device according to claim 8, further comprising a support member for supporting or holding the soluble measuring member.

* * * * *